United States Patent
Kenney et al.

(10) Patent No.: US 6,735,242 B1
(45) Date of Patent: May 11, 2004

(54) TIME TRACKING LOOP FOR PILOT AIDED DIRECT SEQUENCE SPREAD SPECTRUM SYSTEMS

(75) Inventors: Thomas J. Kenney, San Diego, CA (US); Weiping Xu, San Diego, CA (US)

(73) Assignee: Nokia Corporation, Irving, TX (US)

( * ) Notice: Subject to any disclaimer, the term of this patent is extended or adjusted under 35 U.S.C. 154(b) by 0 days.

(21) Appl. No.: 09/386,060

(22) Filed: Aug. 30, 1999

(51) Int. Cl.[7] ............................ H04B 7/216; H04L 7/10
(52) U.S. Cl. ..................... 375/150; 375/222; 370/515
(58) Field of Search ................... 375/150, 222; 370/335, 515, 342; 342/357.04; 331/1 A (56) References Cited

U.S. PATENT DOCUMENTS

| | | | |
|---|---|---|---|
| 4,119,926 A | * 10/1978 | Frosch et al. | 331/1 A |
| 5,570,349 A | * 10/1996 | Bustamante et al. | 370/335 |
| 5,638,362 A | * 6/1997 | Dohi et al. | 370/342 |
| 5,729,570 A | 3/1998 | Magill | 375/313 |
| 5,734,674 A | 3/1998 | Fenton et al. | 375/207 |
| 5,736,961 A | * 4/1998 | Fenton et al. | 342/357.04 |
| 5,771,264 A | 6/1998 | Lane | 375/376 |
| 5,789,954 A | 8/1998 | Toeppen et al. | 327/158 |
| 5,809,064 A | 9/1998 | Fenton et al. | 375/208 |
| 5,987,014 A | * 11/1999 | Magill et al. | 370/335 |
| 6,272,168 B1 | * 8/2001 | Lomp et al. | 375/222 |
| 6,373,862 B1 | * 4/2002 | Kiasaleh | 370/515 |

* cited by examiner

Primary Examiner—Stephen Chin
Assistant Examiner—Edith Chang
(74) Attorney, Agent, or Firm—Milan Patel; Tom Weber (57) ABSTRACT

A novel design of, and method of operation for, a coherent delay lock loop (DLL) for communication systems that employ a pilot channel or pilot symbols is disclosed. Pilot information is used to produce an estimate of signal phase and thereby remove the need for the magnitude operation within the DLL arms. The disclosed design and method afford better time-tracking performance by avoiding the squaring loss (due to the magnitude operation) encountered in noncoherent DLL designs. Alternative embodiments disclose designs and methods that are robust to signal amplitude variation. A first alternative normalizes a DLL error signal by a computed estimate of the squared magnitude of the pilot signal. A second alternative normalizes the error signal using only the early and late signals and therefore is applicable for noncoherent DLL designs as well as coherent DLL designs.

13 Claims, 8 Drawing Sheets

TIME TRACKING LOOP FOR PILOT AIDED DIRECT SEQUENCE SPREAD SPECTRUM SYSTEMS

FIELD OF THE INVENTION

The present invention relates to timing alignment for demodulation of a digital signal and, more particularly, to signal timing alignment using a delay lock loop (DLL) in Direct Sequence Spread Spectrum (DSSS) communications.

BACKGROUND OF THE INVENTION

Spread spectrum communication schemes were originally developed for the military to solve the problem of signal jamming by an enemy. The basic idea behind spread spectrum is that by broadcasting a signal over a wide range of frequencies, the enemy is prevented from jamming the signal. There are three main types of spread spectrum communications: Frequency-Hopping; Direct Sequence; and Hybrid. The Frequency-Hopping scheme avoids jamming by hopping from frequency to frequency in a pattern known to the transmitter and receiver but not to the jammer. In Direct Sequence Spread Spectrum (DSSS) communications, a transmitted signal is broadcast over a very wide band of frequencies to avoid narrow-band interference. Because a transmitted signal is spread over a broad frequency band, many transmitters may be broadcasting in the same bands. DSSS systems use a unique identifier code assigned to each transmitter to enable a receiver to separate a signal of a particular transmitter from that of all the other signals in the same bandwidth. Hybrid spread spectrum schemes are a combination of the Direct Sequence and Frequency-Hopping schemes.

One example of a DSSS-type system is a Code Division Multiple Access (CDMA) type system. In a CDMA type system, multiple users simultaneously communicate while sharing the same wideband frequency spectrum. Each of the users is assigned a unique digital pseudonoise (PN) code sequence. During transmission, the PN code sequence is used to spread the transmitted signal over the CDMA frequency spectrum. Spreading is sometimes referred to as "chipping" because each bit of the signal is chipped into "chips" by the spreading code. In other words, a bit to be transmitted is broken down into chips by the spreading code and, after transmission, the chips are reassembled into the original bit at the receiver. The spread (or "chipped") signal is then RF modulated and transmitted on a carrier frequency. The same carrier frequency may also carry other users' transmissions that have been spread by their unique PN sequences. Transmissions by all other transmitters appear only as additional noise to a receiver listening to a particular transmitter. Assuming that all the transmissions are received at approximately the same power level, carefully choosing the PN code sequences to be orthogonal allows the noise from the other transmitters to be filtered out by the receiver.

Synchronization of PN code sequences between the receiver and transmitter is a serious problem in DSSS systems. To accurately decode a DSSS transmission, a receiver must synchronize its PN code generator to the transmitter PN code generator. Synchronization is usually accomplished in two steps. The first step, called acquisition or detection, includes bringing the PN code sequences generated in the transmitter and receiver into coarse alignment, typically within one code chip interval (in other words, within one chip period). The second step, called the time tracking loop, involves fine synchronization to the received signal and continuous tracking to maintain the best possible waveform alignment during reception by means of a feedback loop. The time tracking loop corrects for the Doppler effect as a mobile station moves toward or away from a base station.

Due to the importance of synchronization in DSSS systems, many synchronization schemes have been proposed that utilize various types of detectors and decision strategies. A common feature of most synchronization schemes (such as the maximum likelihood acquisition method discussed below) is that the received signal and the locally generated PN code sequence(s) are first correlated to determine the measure of similarity between the sequences. Next, the measure of similarity is compared to a predetermined threshold to decide if the signals are in synchronization. If there is no synchronization, the acquisition procedure provides a change in the phase of the locally generated PN code sequence and another correlation is attempted as a part of the signal search through the receiver's phase space.

Initial acquisition or detection of a DSSS signal may be accomplished using the maximum likelihood acquisition method. In maximum likelihood acquisition, the received signal and the locally generated PN code sequence(s) are first correlated in the receiver to determine the measure of similarity between the signals. Next, the measure of similarity indicated by the correlated results is compared to a threshold to decide if the two signals are in coarse synchronization. The threshold may be determined a priori or may be an adaptive threshold, set according to the results of correlations with previous PN code phases. In the adaptive threshold method, the entire PN code space is searched and the PN code phase resulting in the maximum threshold is used to receive further communications.

Most American CDMA cellular (mobile) systems operate according to the Telecommunications Industry Association/Electronic Industry Association (TIA/EIA) IS-95 cellular system standard. IS-95 is also commonly known as CDMA-one.

In an IS-95 system, the downlink transmission consists of at least one common channel and a number of radio channels. A permanent signal is transmitted on a common pilot channel. It may be used by the mobile for coherent communication to estimate the path loss, so as to set power control initially, and to acquire synchronization to the network. Additional channels are set aside for paging and other downlink information.

In an IS-95 system, a mobile station must quickly search, acquire, and synchronize to many different signals while maintaining communications with the system. The mobile station must initially acquire a pilot channel from a base station of the system upon power-up or entry into the system. As the mobile station moves through the system, it must continually search for stronger pilot channels of base stations located near the base station with which the mobile station is communicating. The mobile station searches for pilot channels based on PN pilot channel phase information received from the system. The pilot channels in IS-95 are transmitted by each base station using the same system PN code but with different phase offsets. The code phase offsets allow the pilots to be distinguished from one another and thus uniquely identify each base station to the mobile station. All pilot channels in the IS-95 system use Walsh code 0 (a sequence of all 1's).

In an IS-95 system, when the mobile station has detected acquisition of a pilot channel of a certain base station (or system) PN code phase, the mobile station attempts to decode a synchronization (SYNC) channel at the same PN code phase. This SYNC channel is spread by the base station PN code phase and a unique Walsh PN code sequence that identifies the SYNC channel transmissions. The SYNC channel frames transmitted on each SYNC channel from each base station are aligned with the pilot PN sequence of that base station, so correct detection and acquisition of the pilot channel allows the SYNC channel frame to be received and decoded. The SYNC channel frame includes a SYNC Channel Message that provides system parameters to the mobile station. The system parameters in the SYNC channel frame include the timing of the base station's pilot sequence with respect to the system timing and the base station's paging channel data rate. Once the mobile station has obtained information from the SYNC Channel Message, the mobile station adjusts its timing to correspond to the system's timing and begins monitoring the paging channel.

If the process of synchronizing to the system, which includes acquiring the pilot channel and synchronizing to the SYNC channel, involves false detections of the pilot channel, significant penalties in time may result. In IS-95, if a mobile station falsely detects a pilot channel the mobile station attempts to transition to and decode the SYNC channel. The mobile station may spend up to one second attempting to decode the SYNC channel, after which the process of acquisition and synchronization will start again. The time spent attempting to decode the SYNC channel after false detection of the pilot channel is significant, when taking into account that acquisition and synchronization times of less than two seconds are typical goals for mobile station manufacturers.

There are basically two mechanisms within a CDMA receiver to provide proper chip timing alignment (synchronization) for demodulation. The first is referred to as PN acquisition, where the coarse PN alignment of the received signal is found using a locally generated replica of the PN sequence. This alignment is usually within one chip period, the accuracy of which is a function of the sampling rate used for acquisition. The second mechanism is the time tracking loop, which in spread spectrum systems is commonly referred to as a delay lock loop (DLL). The task of the DLL is to attain and maintain fine timing resolution, thereby providing the optimum timing epoch for the received data in the receiver.

Figure 1:
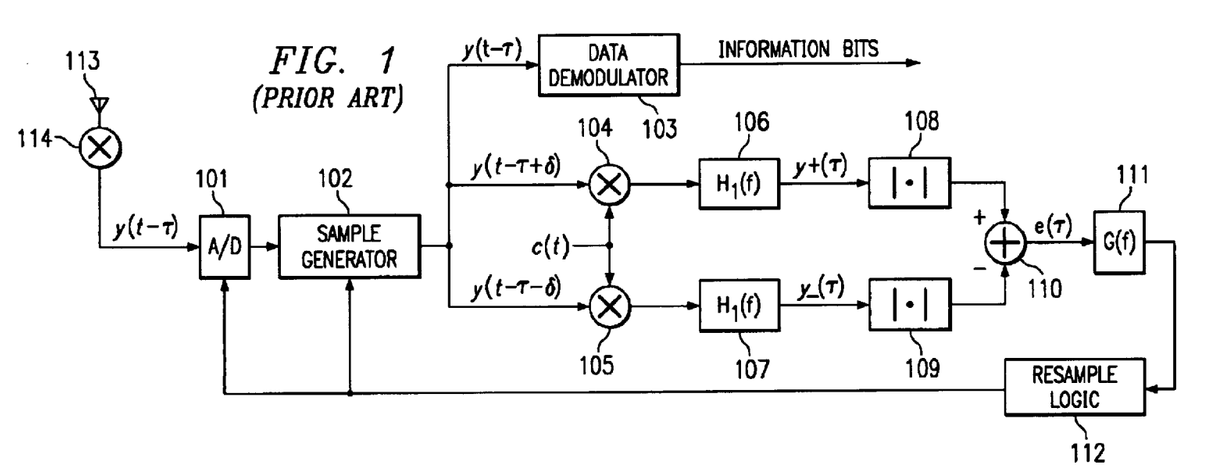
FIG. 1 depicts a typical prior art receiver with a Noncoherent Early-Late DLL structure.

In most DSSS systems the time tracking loop error detector is designed using a noncoherent DLL. Various schemes exist to implement these timing error estimators (Tau Dithered, Early-Late, Early-On Time, etc.). Noncoherent approaches are used because either the phase of the signal is not available to the tracking loop or there is data information which is embedded within the receive signal and is not known a priori. FIG. 1 shows a typical (prior art) receiver with noncoherent Early-Late DLL structure.

Referring to FIG. 1, a signal $y(t-\tau)$ is received by an antenna 113 and passes through duplexer 114 to Analog-to-Digital (A/D) converter 101. The signal next passes to Sample Generator 102 which samples the digital signal. The signal $y(t-\tau)$ then is demodulated into information bits by Data Demodulator 103.

The time at which A/D Converter 101 and Sample Generator 102 operate on signal $y(t-\tau)$ is fine-tuned by the DLL. The DLL architecture shown in FIG. 1 is the Early-Late architecture, so named because the signal to the Late arm is delayed by $\delta$ seconds and the signal to the Early arm is advanced by $\delta$ seconds. An "arm" of the DLL circuit is typically a portion of the circuit that is electrically parallel with another portion of the circuit but can be generally thought of as a path through a portion of an electrical circuit. Multiple "arms" are not required. For example, if a DLL only operated on either the Early signal or the Late signal, the Early (or Late) signal path through the DLL would be considered an "arm" even though it is not electrically in parallel with a Late (or Early) signal path. The Early signal $y(t-\tau+\delta)$ is despread with PN code sequence $c(t)$ by Correlator 104. The Late signal $y(t-\tau-\delta)$ is despread with PN code sequence $c(t)$ by Correlator 105. Both correlated signals pass through their respective Filters 106, 107 and Magnitude Operators 108, 109. Only real components of the Early and Late signals remain after the Magnitude Operators 108, 109 have removed the phase components by performing a squaring operation. The real components are then subtracted from each other by Subtractor 110 to arrive at a difference which is known as the error signal $e(\tau)$. In this example, the Early and Late signal arms begin at the node after Sample Generator 102 and end at Subtractor 110. The error signal $e(\tau)$ passes through Filter 111 to Resample Logic 112, which adjusts the operation of A/D Converter 101 and Sample Generator 102 in response to $e(\tau)$.

Some basic mathematical expressions describing the process in FIG. 1 follow. The equivalent lowpass input signal is expressed as:

$$r(t) = \sqrt{2E}\, c(t-\tau)e^{j\theta(t)} + n(t) \qquad (1)$$

Where E is the chip energy, $c(t-\tau)$ is the received PN with the unknown transmission delay, $\tau$, $n(t)$ is the complex additive noise, $\theta(t)$ is the unknown phase term consisting of a constant and a term proportional to the Doppler or untracked AFC phase term. The input signal is then sampled to give two delayed versions $y(t-\tau+\delta)$ and $y(t-\tau-\delta)$ that are correlated with the locally generated PN sequence to produce:

$$y_\pm(t) = \sqrt{2E}\, c(t-\tau)c(t-\hat\tau\pm\delta)e^{j\theta(t)} + n_\pm(t)c(t-\hat\tau\pm\delta).$$

Where t is time, $\tau$ is the relative timing error (fraction of a chip) between the transmitter and receiver, $\hat\tau$ is the DLL estimate of the timing error, $\delta$ is the correlator spacing which is restricted to a range of $\delta \leq T_c$, and $T_c$ is the chip period. Typically $\delta$ is set equal to $$\frac{T_c}{N},$$

where N is an integer larger than unity.

The subscript denotes the respective advanced or retarded signal. After integration and filtering, the energy is computed for each signal and then the two signals are subtracted to form a difference:

$$e(\tau) = \left|\sqrt{2E}\, c(t-\tau)c(t-\hat\tau-\delta)e^{j\theta(t)} + n_-(t)c(t-\hat\tau-\delta)\right| - \qquad (3)$$
$$\left|\sqrt{2E}\, c(t-\tau)c(t-\hat\tau+\delta)e^{j\theta(t)} + n_+(t)c(t-\hat\tau+\delta)\right|$$

The above expression ignores the filtering process for clarity. A loop filter having a bandwidth determined by the tracking dynamics and pull-in time requirements then filters this error signal. The output of the loop filter is sent to some further logic or becomes a stimulus signal depending on the sampling mechanism.

As is clear from expression (3), each of the DLL arm signals (arm signals are the signals present on an "arm" of the DLL) has its phase components eliminated by a nonlinear squaring operation. The squaring results in a degradation of SNR. This degradation is a function of sampling bandwidth, loop bandwidth and input SNR. A large disadvantage of the squaring operation is that it causes increased degradation in loop SNR as the input SNR decreases. For narrow loop bandwidths the degradation in loop SNR is in the range of 3 to 8 dB, a clearly undesirable result.

In brief, some disadvantages of prior art methods of implementing DLLs for spread spectrum communications are that the DLL uses noncoherent tracking and it is very sensitive to fluctuations in signal magnitude due to the nonlinear squaring operation.

SUMMARY OF THE INVENTION

Prior art methods of implementing noncoherent time tracking loops have several disadvantages, such as high sensitivity to fluctuations in signal magnitude and increased degradation of signal to noise ratio SNR, due to the prior art's reliance on nonlinear squaring operations to create an error signal for controlling signal sampling. Disclosed are innovative circuits and methods that eliminate the nonlinear squaring operation from the time tracking loop, thereby decreasing SNR degradation and improving fine synchronization capability to Direct Sequence Spread Spectrum signals. This improved ability to fine tune receiver synchronization to a DSSS signal is extremely useful in, for example, CDMA mobile telephones.

The disclosed innovations provide a coherent DLL scheme that has improved tracking performance. In the presently preferred embodiment, an innovative coherent DLL scheme is used with DSSS systems that have embedded pilot symbols or a pilot channel available. As an additional improvement, innovative methods and circuits to normalize the tracking loop error signal can be combined with the disclosed innovative DLL. Normalization of the error signal creates a DLL implementation robust to received signal amplitude variation.

The preferred embodiment advantageously eliminates the nonlinear squaring operations used to generate error signals by prior art time tracking loops. In the presently preferred embodiment, a CDMA receiver having a coherent Early-Late DLL uses the on-time signal to estimate the phase component of the Early and Late arms of the DLL. Because the estimated phase is known, the phase error term can be removed from the Early and the Late signals by multiplying by the complex conjugated on-time signal, instead of by the disadvantageous nonlinear squaring operation used in prior art techniques. After the phase terms are removed, the difference between the real components of the Early and Late signals is used as an error signal to finely control the A/D and Sample Generator of the CDMA receiver.

An alternative embodiment discloses further using the on-time signal to normalize the error signal before it is filtered, thus creating a DLL that is tolerant of received signal amplitude variation. The on-time signal is multiplied by its conjugate to yield an on-time signal composed of only real components (i.e., without phase terms). Normalization is accomplished by dividing the error signal by the real on-time signal. The resultant normalized error signal is used to control the A/D and Sample Generator.

Another alternative embodiment achieves an advantageous amplitude invariance by use of only the phase-removed Early and phase-removed Late signals to normalize the error signal before filtering. The on-time signal is not used for normalization. In a coherent DLL, the arm signals are multiplied by the conjugated on-time signal, which removes the phase terms from the arm signals, leaving only the real components of the arm signals. These real components are subtracted to yield an error signal that is normalized by division by the sum of the arm signals. A further advantage of this embodiment is that it is applicable to noncoherent, as well as coherent, time tracking loops. Noncoherent DLLs can implement this novel error signal normalization scheme by dividing the difference of the squared arm signals by the sum of the squared arm signals. Thus, noncoherent DLLs could use this inventive scheme to normalize the DLL error signal and achieve increased tolerance to received signal amplitude variation.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 2:
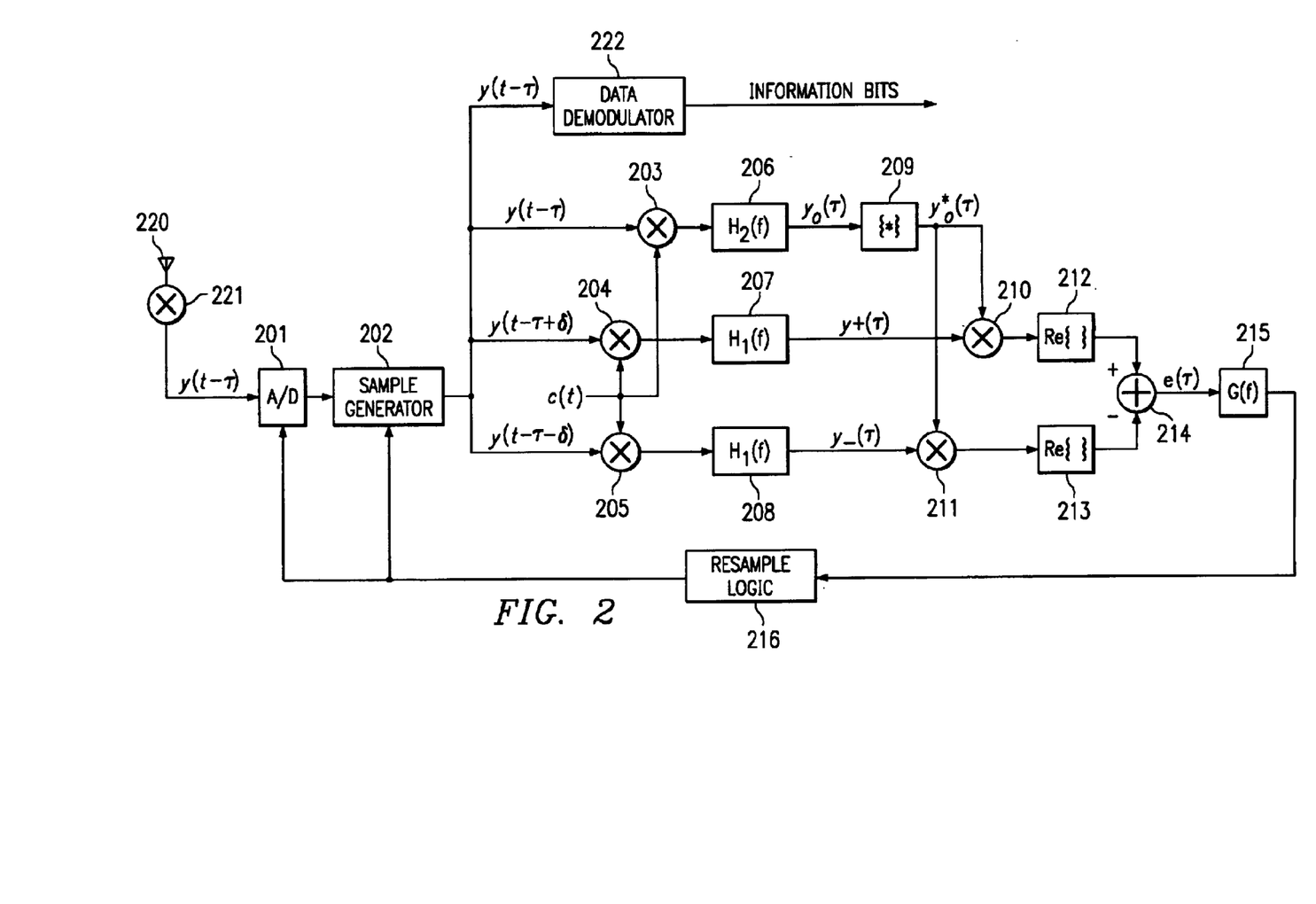
FIG. 2 depicts a receiver with a novel Coherent DLL using Early-Late structure, with removal of phase error term prior to Subtractor.

The presently preferred embodiment of the disclosed innovations is shown in FIG. 2. The approach described therein uses the pilot information to produce an estimate of the phase and thereby remove the need for the magnitude operation within the DLL arms. Unlike prior art time tracking loops, there is no need to remove unknown data through squaring (or higher order operation depending on modulation), because a pilot signal or symbols are available.

There are three signals used in the DLL by the disclosed scheme. In prior art schemes the on-time signal, spaced in the center for an early-late DLL, is used for data demodulation only. The disclosed approach will use this on-time signal, which also contains the on-time signal for the pilot symbols or channel, to remove the phase term.

Referring to FIG. 2, a signal $y(t-\tau)$ is received by an antenna 220 and passes through duplexer 221 to Analog-to-Digital (A/D) converter 201. The signal next passes to Sample Generator 202, which samples the digital signal. The signal $y(t-\tau)$ then is demodulated into information bits by Data Demodulator 222.

As shown in FIG. 2, the on-time signal $y(t-\tau)$ is also correlated with the local PN code sequence $c(t)$ and filtered using $H_2(f)$.

$$y_o(t) = \sqrt{2E}\, c(t-\tau)c(t-\hat{\tau})e^{j\hat{\theta}(t)} + n_\pm(t)c(t-\hat{\tau}) \quad (4)$$

where $\hat{\theta}(t)$ is the estimate of the phase attained from the pilot channel or symbols and again $\hat{\tau}$ is the DLL estimate of the timing error. In equation (4) filtering is again ignored for clarity. FIG. 2 discloses an embodiment for use with systems that have a pilot channel. Systems where the pilot symbols are interspersed, or embedded, with the data require other logic to extract the pilot bits from the data field.

The time at which A/D Converter 201 and Sample Generator 202 operate on signal $y(t-\tau)$ is fine-tuned by the DLL. The DLL architecture shown in FIG. 2 is a coherent architecture, so named because the DLL time tracking loop maintains fine synchronization by use of the on-time signal $y(t-\tau)$. The On-Time signal $y(t-\tau)$ is despread (correlated) with PN code sequence $c(t)$ by Correlator 203. The Early signal $y(t-\tau+\delta)$ is despread with PN code sequence $c(t)$ by Correlator 204. The Late signal $y(t-\tau-\delta)$ is despread with PN code sequence $c(t)$ by Correlator 205. All the correlated signals pass through their respective Filters 206, 207, and 208. Conjugator 209 conjugates the filtered On-Time signal $y_o(t)$ to arrive at a conjugate of a term containing the phase estimate. Next Multipliers 210 and 211 remove the phase error term from the filtered Early and Late signals. Only real components of the Early 212 and Late 213 signals remain after the Multipliers 210, 211 have removed the phase components. The real components of the Early and Late signals are then subtracted from each other by Subtractor 214 to arrive at a difference which is known as the error signal $e(\tau)$. The error signal $e(\tau)$ passes through Filter 215 to Resample Logic 216, which adjusts the operation of A/D Converter 201 and Sample Generator 202 in response to the $e(\tau)$.

The filtered on-time signal is then conjugated and multiplied by both the early $y(t-\tau-\delta)$ and late $y(t-\tau+\delta)$ signal. The real part of the output of the multipliers is then subtracted to form a difference or error signal:

$$e(\tau) = Re\{y_-(t)y_o^*(t)\} - Re\{y_+(t)y_o^*(t)\} \quad (5)$$

This error signal is then filtered and further processed in a similar manner to the prior art noncoherent mode DLL.

It can be seen when equation (3) and (5) are compared, that in (5) the squaring operation is not required and, therefore, SNR is improved because the received PN noise is not squared. If it is assumed that a perfect phase estimate is made, then there is no loss in removing the phase term. Therefore, using this approach and assuming perfect timing, a 2 to 8 dB improvement in the loop SNR is attained. Put another way, while maintaining the same loop bandwidth and typical SNR levels, this approach will have a lower tracking variance, provide better tracking performance, and therefore lower bit error rate in the receiver. It also will improve the receiver's ability to track in much poorer SNR conditions when compared to a noncoherent approach. In fact, as SNR decreases, the squaring loss increases, further degrading performance of the noncoherent DLL.

Figure 2A:
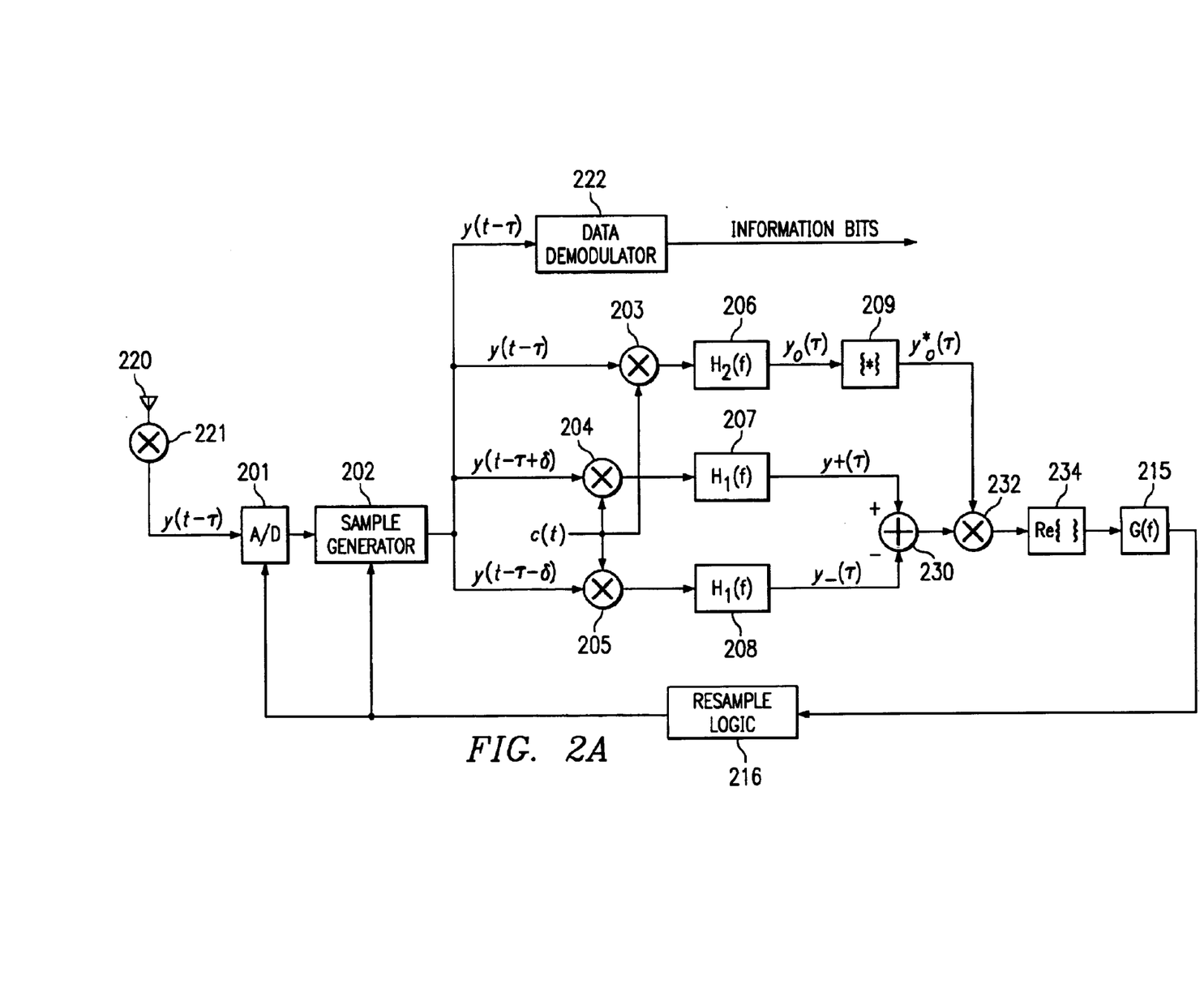
FIG. 2A depicts a receiver with a novel Coherent DLL using Early-Late structure, with removal of phase error term after Subtractor.

FIG. 2A discloses an alternative embodiment of the circuit of FIG. 2. The Late arm signal is subtracted from Early arm signal by subtractor 230 to form a composite Early-Late signal. The composite signal, from 230, is multiplied with the on-time conjugate signal, from 209, by multiplier 232. The resulting real signal 234 passes to filter 215 and resample logic 216 just as explained in the discussion about FIG. 2 above.

Pilot Signal Normalization

Figure 3:
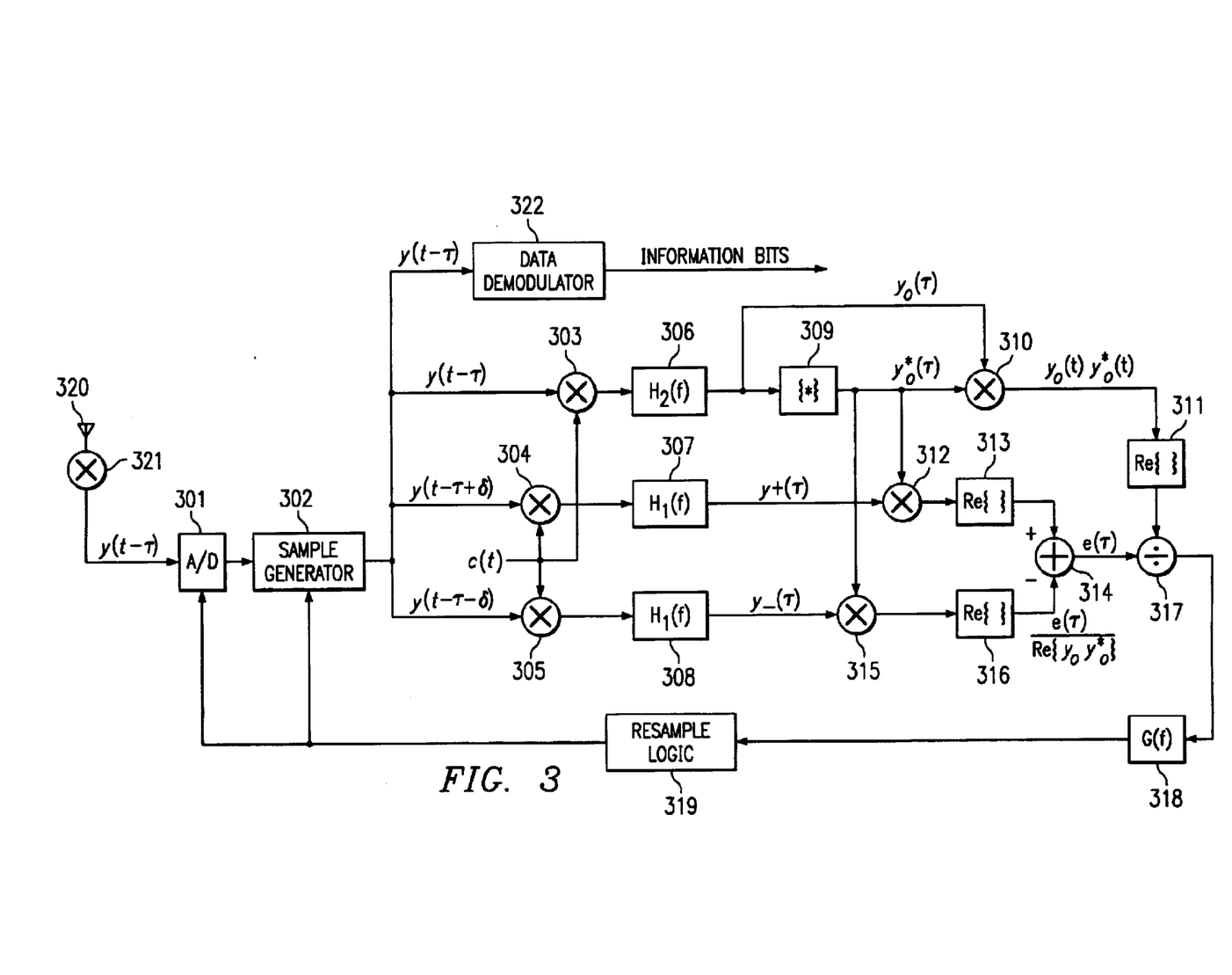
FIG. 3 depicts a receiver with a novel Coherent DLL using Early-Late structure with novel Pilot Signal Normalization.

In addition to the innovations disclosed above, a novel method to normalize the error signal is implemented in FIG. 3, thereby providing an approach which is robust to signal amplitude variation. The pilot signal is used to compute an estimate, $y_o(t)y_o^*(t)$, of the pilot squared amplitude. The error signal is then normalized by the estimate of the pilot squared amplitude in order to normalize the error signal, producing a new error signal:

$$e(\tau) = \frac{Re\{y_-(t)y_o^*(t)\} - Re\{y_+(t)y_o^*(t)\}}{Re\{y_o(t)y_o^*(t)\}}. \quad (6)$$

In steady-state tracking conditions the numerator will always be less than the denominator, thereby providing a normalized error signal for tracking. This is true because the pilot channel is multiplied by both Early and Late signals. Thus, when perfect phase estimation is achieved, the phase components in the numerator and denominator are eliminated. This produces an Early and Late difference amplitude (error signal) divided by the pilot amplitude. Additionally, because the on-time signal amplitude is larger than the Early or Late amplitudes when in steady state, the error signal is normalized. This normalization scheme allows the DLL design to have a loop bandwidth independent of received signal amplitude.

As shown in FIG. 3, a signal $y(t-\tau)$ is received by an antenna 320 and passes through duplexer 321 to Analog-to-Digital (A/D) converter 301. The signal next passes to Sample Generator 302 which samples the digital signal. The signal $y(t-\tau)$ then is demodulated into information bits by Data Demodulator 322.

The time at which A/D Converter 301 and Sample Generator 302 operate on signal $y(t-\tau)$ is fine-tuned by the DLL.

The DLL architecture shown in FIG. 3 is a coherent architecture. The On-Time signal y(t−τ) is despread (correlated) with PN code sequence c(t) by Correlator 303. The Early signal y(t−τ+δ) is despread with PN code sequence c(t) by Correlator 304. The Late signal y(t−τ−δ) is despread with PN code sequence c(t) by Correlator 305. All the correlated signals pass through their respective Filters 306, 307, and 308. Conjugator 309 conjugates the filtered On-Time signal $y_o(t)$ to arrive at the phase estimate. Multipliers 312 and 315 remove the phase error from the filtered Early and Late signals. Only real components of the Early 313 and Late 316 signals remain after the Multipliers 312, 315 have removed the phase error term. The real components of the Early and Late signals are then subtracted from each other by Subtractor 314 to arrive at a difference which is known as the error signal e(τ).

The primary difference between FIG. 3 and FIG. 2 is that Multiplier 310 multiplies the filtered On-Time signal $y_o(t)$ with its conjugate, leaving only the real component 311 (magnitude). Divider 311 uses the real component of the On-Time signal to normalize error signal e(τ). Then the normalized error signal e(τ) passes through Filter 318 to Resample Logic 319, which adjusts the operation of A/D Converter 301 and Sample Generator 302 in response to the normalized e(τ).

Summation Normalization

Figure 4:
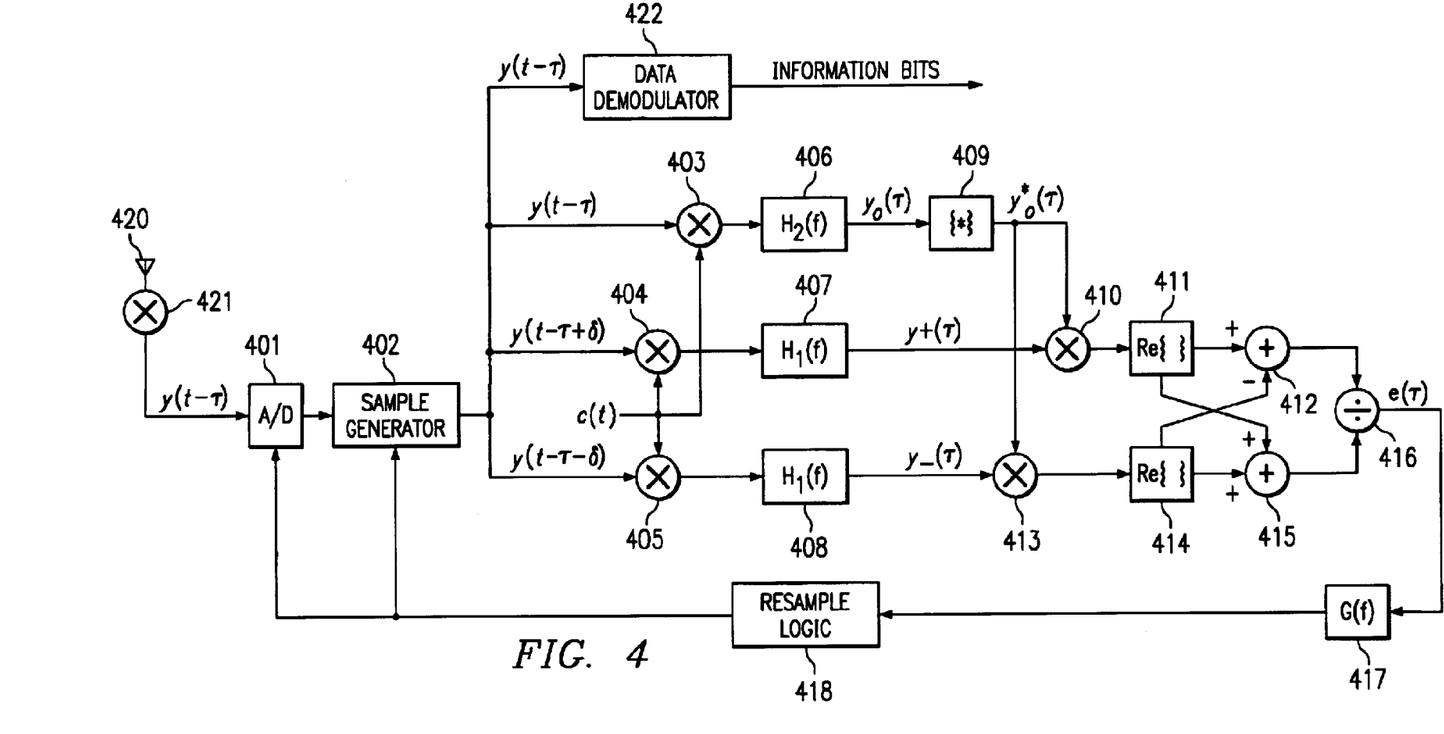
FIG. 4 depicts a receiver with a novel Coherent DLL using Early-Late structure with novel Summation Normalization.
Figure 5:
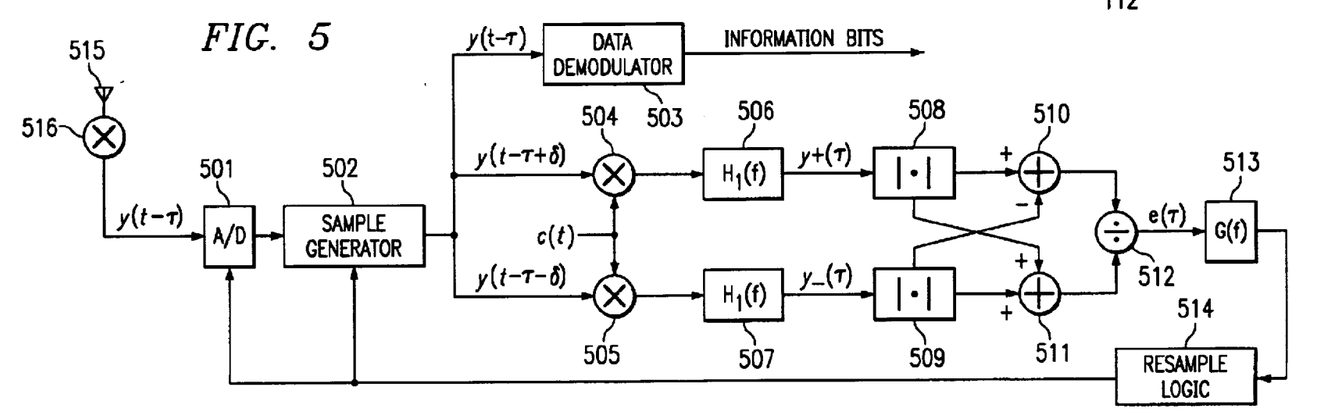
FIG. 5 depicts a receiver with a Noncoherent DLL using Early-Late structure with novel Summation Normalization.

A novel approach to normalize the error signal in a coherent Early-Late DLL is disclosed in FIG. 4. This innovative normalization scheme may also be applied to a noncoherent Early-Late DLL, as shown in FIG. 5.

Referring to FIG. 4, two new signals are created from the Early and Late signals. These new signals are formed by subtracting and summing, respectively, the filtered Early and Late signals. The subtraction forms the difference or error signal similar to the embodiments discussed above. The summation, however, is used to divide the error signal in order to normalize the error signal. In essence, the DLL shown in FIG. 4 is very similar to that shown in FIG. 2. The only significant difference is that the real parts of the Early and Late signals are added together and used to normalize the error signal.

$$e(\tau) = \frac{|Re\{y_-(t)y_o^*(t)\}| - |Re\{y_+(t)y_o^*(t)\}|}{|Re\{y_-(t)y_o^*(t)\}| + |Re\{y_+(t)y_o^*(t)\}|}. \quad (7)$$

The disclosed novel summation normalization approach can also be applied to noncoherent DLL designs. The error signal, in pull-in and tracking, will always be less then unity using this approach. This is very advantageous for fixed-point hardware or software implementations.

As shown in FIG. 4, a signal y(t−τ) is received by an antenna 420 and passes through duplexer 421 to Analog-to-Digital (A/D) converter 401. The signal next passes to Sample Generator 402 which samples the digital signal. The signal y(t−τ) then is demodulated into information bits by Data Demodulator 422.

The time at which A/D Converter 401 and Sample Generator 402 operate on signal y(t−τ) is fine-tuned by the DLL. The DLL architecture shown in FIG. 4 is a coherent architecture. The On-Time signal y(t−τ) is despread (correlated) with PN code sequence c(t) by Correlator 403. The Early signal y(t−τ+δ) is despread with PN code sequence c(t) by Correlator 404. The Late signal y(t−τ+δ) is despread with PN code sequence c(t) by Correlator 405. All the correlated signals pass through their respective Filters 406, 407, and 408. Conjugator 409 conjugates the filtered On-Time signal $y_o(t)$ to arrive at the phase estimate. Multipliers 410 and 413 multiply the phase estimate from the filtered Early and Late signals, removing the phase error term. Only real components of the Early 411 and Late 414 signals remain after the Multipliers 410, 413 have removed the phase components. The real components of the Early and Late signals are then subtracted from each other by Subtractor 412 to arrive at a difference which is known as the error signal e(τ).

The primary difference between FIG. 4 and FIG. 2 is that Adder 415 adds the real components of the Early 411 and Late 414 signals. Divider 416 then uses this sum to normalize the error signal e(τ). Then the normalized error signal e(τ) passes through Filter 417 to Resample Logic 418, which adjusts the operation of A/D Converter 401 and Sample Generator 402 in response to the normalized e(τ).

FIG. 5 shows noncoherent early-late DLL architecture using the disclosed novel summation normalization. A signal y(t−τ) is received by an antenna 515 and passes through duplexer 516 to Analog-to-Digital (A/D) converter 501. The signal next passes to Sample Generator 502 which samples the digital signal. The signal y(t−τ) then is demodulated into information bits by Data Demodulator 503.

The time at which A/D Converter 501 and Sample Generator 502 operate on signal y(t−τ) is fine-tuned by the DLL. The DLL architecture shown in FIG. 5 is a noncoherent architecture, so named because the DLL time tracking loop operates without using the unmodified on-time signal. The Early signal y(t−τ+δ) is despread with PN code sequence c(t) by Correlator 504. The Late signal y(t−τ−δ) is despread with PN code sequence c(t) by Correlator 505. Both correlated signals pass through their respective Filters 506, 507 and Magnitude Operators 508, 509. Only real components of the Early and Late signals remain after the Magnitude Operators 508, 509 have removed the phase error term. The real components of the Early and Late signals are then subtracted from each other by Subtractor 510 to arrive at a difference which is known as the error signal e(τ). The real components are also added together by Adder 511 to arrive at a sum which Divider 512 uses to normalize the error signal e(τ). The normalized error signal e(τ) passes through Filter 513 to Resample Logic 514, which adjusts the operation of A/D Converter 501 and Sample Generator 502 in response to the normalized e(τ).

Figure 6:
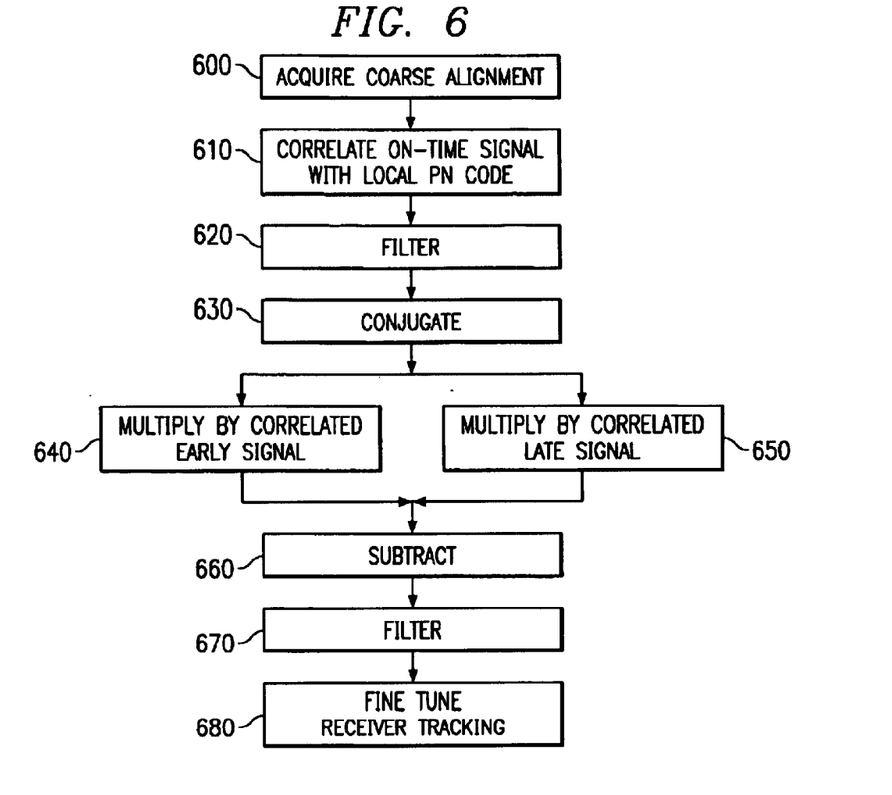
FIG. 6 depicts a novel method of synchronizing a receiver, having a coherent DLL using Early-Late structure, to a DSSS signal.

FIG. 6 shows a block diagram of a method of synchronizing a receiver, having a coherent DLL using Early-Late structure, to a DSSS signal. The receiver first acquires a coarse alignment to a received DSSS signal in 600. The received on-time signal is correlated with a local PN code sequence in 610 to create a correlated on-time signal. The correlated on-time signal may pass through optional filtering step 620 before being conjugated in step 630. The conjugated on-time signal is them multiplied by a correlated Early signal and correlated Late signal in steps 640 and 650, respectively. The Early and Late signals are from the respective Early and Late signal arms of the DLL. The resulting signals from the multiplication steps are then subtracted from each other in step 660 to arrive at a difference that is the error signal. The error signal may then be filtered in step 670 before fine tuning the receiver tracking circuitry.

Figure 7:
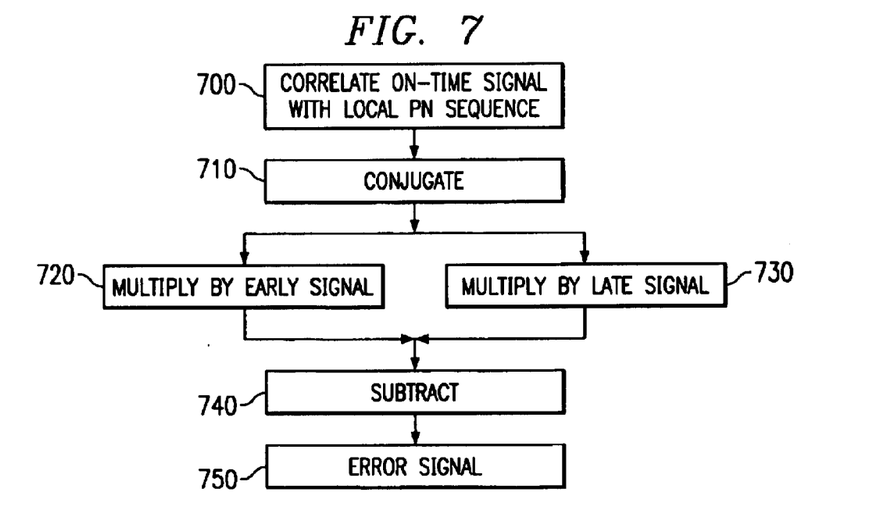
FIG. 7 depicts a method of determining an error signal in a novel Coherent DLL using Early-Late structure.

FIG. 7 depicts a method of determining an error signal in a coherent DLL having Early-Late structure. The on-time signal is correlated with a local PN sequence in step 700. The correlated on-time signal is then conjugated in step 710. The conjugated on-time signal is multiplied by an Early signal and a Late signal in step 720 and 730, respectively, to yield real magnitude signals. The result of the multiplication steps is subtracted in step 740 to yield a real error signal 750.

Figure 8:
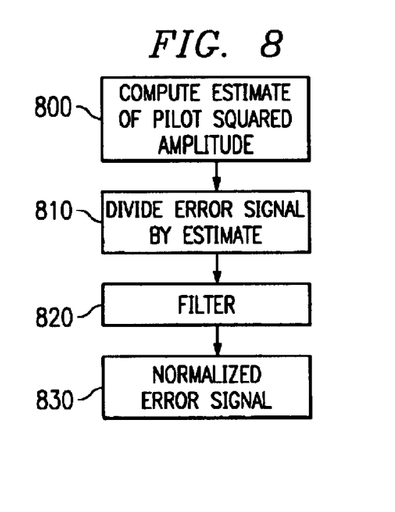
FIG. 8 depicts a method of normalizing an error signal in a coherent DLL having an Early-Late structure.

FIG. 8 shows a method of normalizing an error signal in a coherent DLL having an Early-Late structure. This method may be used in combination with the disclosed methods of calculating an error signal or any suitable method of calculating an error signal. First, in step 800, an estimate of the pilot on-time squared amplitude is computed. Then, in step 810, the error signal is divided by the estimate to create a normalized error signal 830 which may pass through optional filtering step 820. FIG. 3 shows one possible circuit implementation of this method of error signal normalization.

Figure 9:
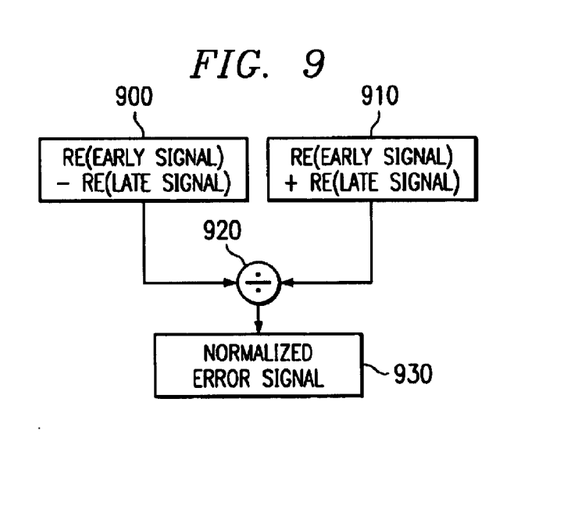
FIG. 9 depicts a method of normalizing an error signal in a DLL having an Early-Late structure.

FIG. 9 shows a block diagram of a method of normalizing an error signal in a coherent or noncoherent DLL having an Early-Late structure. In step 900, the real portion of the Early signal is subtracted from the real portion of the Late signal to yield an error signal. The real portion of the Early signal is added to the real portion of the Late signal in step 910 to yield a normalizing signal. In step 920, the error signal from step 900 is divided by the normalizing signal from step 910, resulting in a normalized error signal 930. A circuit implementing this method in a coherent DLL is shown in FIG. 4 and a circuit implementing this method in a noncoherent DLL is shown in FIG. 5.

Figure 10:
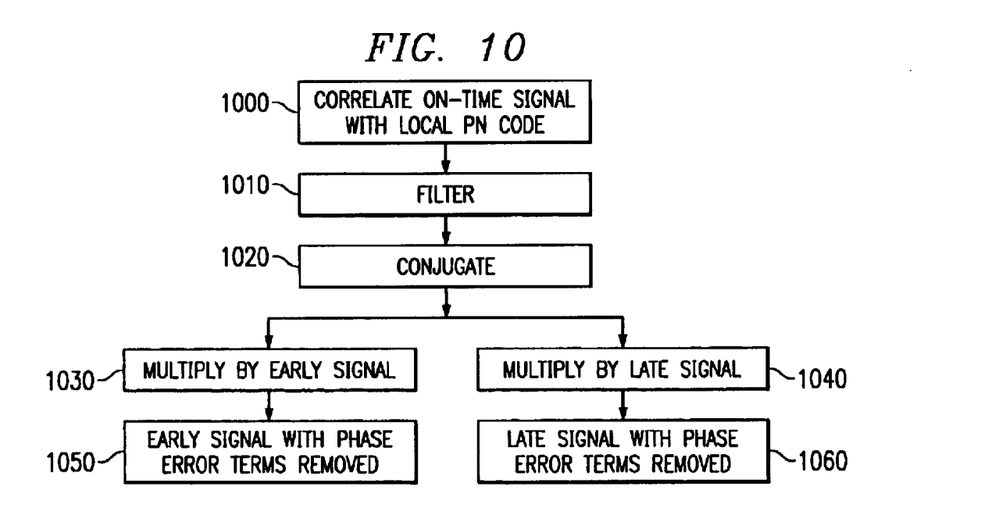
FIG. 10 depicts a method of removing the phase error term from early and late signals of a DLL having Early-Late structure.

FIG. 10 shows a block diagram of a method of removing the phase error terms from the Early and Late signals of a coherent DLL having an Early-Late structure. In step 1000, the received on-time signal is correlated with a local PN code sequence. The correlated on-time signal from step 1000 is optionally filtered in step 1010 before being conjugated in step 1020. The conjugated on-time signal from step 1020 is multiplied by the DLL Early signal in step 1030 to arrive at an Early signal with phase error terms removed at step 1050. In step 1040, the conjugated on-time signal is multiplied by the DLL Late signal to arrive at a Late signal with phase error terms removed at step 1060.

Figure 11:
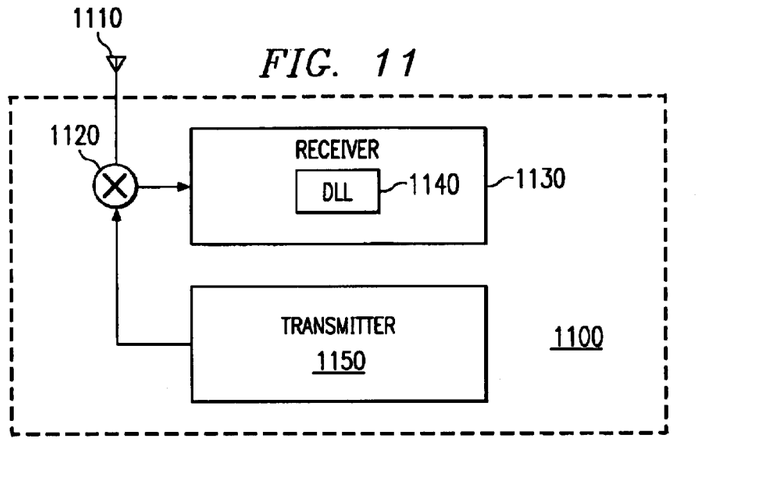
FIG. 11 depicts a radio transceiver having a novel DLL with Early-Late structure that utilizes a phase estimate to remove phase error components from arm signals of the DLL.

FIG. 11 shows a block diagram of a radio transceiver 1100 utilizing the innovative concepts disclosed herein. Antenna 1110 is connected to duplexer 1120. Transmitter 1150 and receiver 1130 are electrically coupled to duplexer 1120. Receiver 1140 has a DLL that may utilize any of the novel circuits or methods discussed herein.

Figure 12:
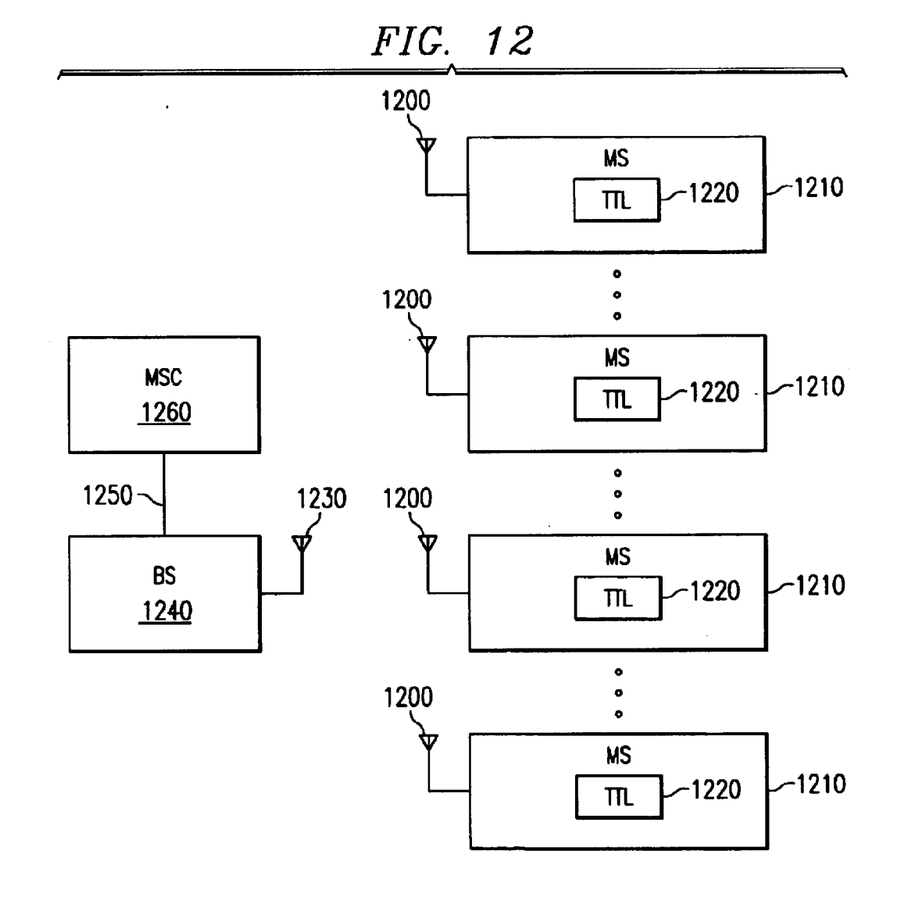
FIG. 12 depicts a CDMA communication system having mobile stations with a time tracking loop that uses a phase estimate to remove phase components from arm signals of the time tracking loop.

FIG. 12 shows an exemplary block diagram of a CDMA communication system utilizing the innovative concepts disclosed herein. The communication system consists of a plurality of mobile stations 1210. Each of the mobile stations 1210 has time tracking loops 1220 that may utilize any of the novel circuits or methods disclosed herein. The mobile stations 1210 communicate via antennas 1200 (over an air communication channel) with at least one base station 1240 having an antenna 1230. Optionally, the base station 1240 communicates over communication channel 1250 with at least one Mobile Switching Center 1260.

As will be recognized by those skilled in the art, the innovative concepts described in the present application can be modified and varied over a tremendous range of applications, and, accordingly, the scope of patented subject matter is not limited by any of the specific exemplary teachings given.

For example, although coherent DLLs with Early-Late architecture are used for exemplary teachings, the innovations disclosed could be used with other time tracking loop architectures such as the Tau-Dithered, Early-On Time, or any other suitable time tracking loop architecture.

For another example, although the arm signals discussed throughout this application for exemplary purposes have been restricted to Early, Late, and On-Time arm signals, other arm signals may be apparent to those skilled in the art. In particular, a different tracking loop architecture (perhaps Tau-Dithered) may have different "arms" and therefore different arm signals.

What is claimed is:

1. A method of normalizing an error signal in a delay lock loop having an early-late structure, comprising the steps of:
    subtracting a portion or a late signal from a portion of an early signal to form an error signal;
    adding the real number part of the early signal to the real number part of the late signal, to generate a normalizing signal; and
    dividing said error signal by said normalizing signal to generate a normalized error signal.

2. A delay lock loop comprising:
    an on-time signal correlator that correlates an on-time signal with a PN code sequence, to produce a correlated on-time signal;
    an on-time signal conjugator that conjugates said correlated on-time signal, to produce a conjugated on-time signal;
    a plurality of delay lock loop arm signal multipliers, wherein each of said multipliers generates a real arm signal by removing phase components from an arm signal by multiplying said arm signal with said conjugated on-time signal;
    a subtractor that generates an error signal proportional to the difference between said real arm signals generated by said multipliers;
    an adder that generates a normalizing signal propoertional to the sum of said real arm signals; and
    a divider that generates a normalized error signal by dividing said error signal by said normalizing signal.

3. The delay lock loop of claim 2, wherein said delay lock loop has an early-late structure.

4. The delay lock loop of claim 2, wherein said delay lock loop has an early-on time structure.

5. The delay lock loop of claim 2, wherein said delay lock loop has a tau-dithered structure.

6. The delay lock loop of claim 2, wherein said arm signal is an early signal.

7. The delay lock loop of claim 2, wherein said arm signal is a late signal.

8. A delay lock loop, comprising:
    a plurality of arm signal nonlinear squaring circuits, wherein each of said squaring circuits generates a real arm signal by removing phase components from an arm signal of said delay lock loop by squaring said arm signal;
    a subtractor that generates an error signal proportional to the difference between said real arm signals generated by said plurality of nonlinear squaring circuits;
    an adder that generates a normalizing signal proportional to the sum of said real arm signals; and
    a divider that generates a normalized error signal by dividing said error signal by said normalizing signal.

9. The delay lock loop of claim 8, wherein said delay lock loop has an early-late structure.

10. The delay lock loop of claim 8, wherein said delay lock loop has an early-on time structure.

11. The delay lock loop of claim 8, wherein said delay lock loop has a tau-dithered structure.

12. The delay lock loop of claim 8, wherein said arm signal is an early signal.

13. The delay lock loop of claim 8, wherein said arm signal is a late signal.

* * * * *